United States Patent [19]

Kurita et al.

[11] 4,171,266
[45] Oct. 16, 1979

[54] RECIPROCALLY DRIVEN APPARATUS FOR TRANSPORTING FILTER PLATES IN FILTER PRESS

[75] Inventors: Tetsuya Kurita, Takarazuka; Muneyuki Miyano, Sakai, both of Japan

[73] Assignee: Kurita Machinery Manufacturing Company Limited, Japan

[21] Appl. No.: 859,095

[22] Filed: Dec. 9, 1977

[51] Int. Cl.² ............................................. B01D 25/00
[52] U.S. Cl. ..................................................... 210/230
[58] Field of Search ............................... 100/194–198; 134/144, 172; 210/224–231

[56] References Cited

U.S. PATENT DOCUMENTS

| | | | |
|---|---|---|---|
| 3,306,455 | 2/1967 | Fismer | 210/230 |
| 3,598,240 | 8/1971 | Abe et al. | 210/230 |

FOREIGN PATENT DOCUMENTS

| | | | |
|---|---|---|---|
| 2105402 | 10/1971 | Fed. Rep. of Germany | 210/225 |
| 47-33101 | 8/1972 | Japan | 210/231 |

Primary Examiner—Robert H. Spitzer
Attorney, Agent, or Firm—Holman & Stern

[57] ABSTRACT

An apparatus comprising a pair of reciprocally movable carriers each provided with a drive dog and a stop dog tiltably pivoted to the carrier and biased toward a tilted position in the direction opposite to a direction of transport of filter plates, a stopper for preventing the drive dog positioned toward the opposite direction from tilting toward that direction and releasing the drive dog from its prevented position, another stopper for preventing the stop dog from tilting toward the transport direction, and a freely movable member pushable by the drive dog to raise the stop dog when the drive dog tilts toward the transport direction. After all the filter plates have been transported, the stopper for the drive dog is manually or automatically operated to release the drive dog toward its tilted position, and the direction of the travel of the carrier is reversed, causing the carrier to return free of interference with the group of transported filter plates toward a standby position, where the carrier is stopped with the drive dog held in its raised position by the stopper.

13 Claims, 23 Drawing Figures

RECIPROCALLY DRIVEN APPARATUS FOR TRANSPORTING FILTER PLATES IN FILTER PRESS

BACKGROUND OF THE INVENTION

This invention relates to an apparatus to be driven reciprocally for transporting filter plates in filter presses, the apparatus including a pair of reciprocally movable carriers each provided with a drive dog and a stop dog one of which is alternatively raisable and tiltable in operative relation to each other, such that the filter plates held pressed against a stationary end plate are transported one by one toward a movable end plate in its retracted position by the cooperation of the dogs with the handles of the filter plates movably supported on side bars.

Various apparatus of the type described have been proposed which include such carriers. To transport the filter plates in the same direction repeatedly on completion of every filtration cycle, the carriers must always be returned to a standby position after the transport of the filter plates. U.S. Pat. No. 3,306,455 discloses an apparatus including a carrier which is returnable in a simple fashion along a straight path for the transport of the filter plates. The carrier, having a drive dog and a stop dog, is attached to a drive belt and provided with a cam which is movable relative to the carrier. When the cam comes into contact with a stopper at each end of the filter press, the resulting relative movement between the carrier and the cam brings the drive dog and stop dog into a returnable or standby position. The operation of the dogs in turn actuates a switch to return the carrier or to halt the same in a standby position. Thus the apparatus requires the combination of the two components, namely the carrier and the cam, which are rendered movable relative to each other. Accordingly the apparatus is complex in construction and difficult to make because the carrier and the cam must be maintained in accurate position relative to each other and the parts must be dimensioned and assembled properly. Additionally the adhesion of the cake tends to disturb the position relationship between the two components at the onset of as well as during the operation, thus reducing the stability of the operation including the transport of the filter plates.

U.S. Pat. No. 3,598,240 discloses another apparatus comprising a carrier which is adapted to travel reciprocally to transport the filter plates forward and also backward so that the transport means presses, the filter plates together for filtration and also separates the plates from one another for the removal of the cake after filtration. Because of such a structure, the apparatus does not include means for returning the carrier to its original position after the transport of the filter plates. Each of drive and stop dogs is supported at a movable point and has a front end supported by a loose link and a spring-loaded tail end adapted to be guided by a cam face. The apparatus is therefore very complex in construction, and the dogs operate in delicate fashion in accordance with the shift of the support point, hence reduced stability. Thus the disclosed apparatus is susceptible to malfunction or failure for example due to the deposition of the cake.

The function given to the filter plate transporting apparatus of this type varies from apparatus to apparatus depending on the mode of the operation. Thus various transport apparatuses have heretofore been provided, each as adapted for the particular function required. However the known apparatuses are complex in construction and are not satisfactory in respect of the stability of operation. Moreover no apparatuses have been provided which are provided with several different functions.

SUMMARY OF THE INVENTION

An object of this invention is to provide a filter plate transporting apparatus of simple construction comprising a carrier which is returnable to its original position in a simple manner along a straight path after transporting all the filter plates.

Another object of this invention is to provide an apparatus of the type described in which the carrier is returnable to and stoppable at its standby position automatically and also manually with great ease.

Another object of this invention is to provide an apparatus in which the direction of transport of the filter plates is changeable as desired.

Still another object of this invention is to provide an apparatus in which when a dog on the carrier comes into contact with the handle of the filter plate to reverse the direction of the travel of the carrier, the impact involved is reduced to give the apparatus improved durability, the apparatus further being so adapted that even when a filter plate is in an oblique position, the filter plate can be transported with proper timing on the opposite sides of the plate, each dog on the carrier also being adapted to act on the filter plate with readily adjustable timing.

Chiefly, the apparatus of this invention is characterized in that a drive dog and a stop dog both tiltably pivoted to each of opposite carriers are spring-biased toward a tilted position in the direction opposite to a direction of transport of the filter plates and are operatively associated with each other by a freely movable member interposed between the dogs. The stop dog which is positioned toward the transport direction is prevented by a stopper from tilting toward that direction, while the drive dog which is positioned toward the opposite direction is prevented by another stopper from tilting toward the opposite direction. When the carrier is driven in the opposite direction to the transport direction, the drive dog passes under the handle of the foremost filter plate to be transported, raising the stop dog in operative relation thereto and causing the stop dog to come into contact with the same handle to impede the travel of the carrier. In response to the resulting excess load, the direction of the travel of the carrier is reversed to the transport direction. The drive dog, now in its upright position after passing under the handle, is brought into contact by the return travel of the carrier with the handle which it has passed and transports the filter plate, with the stop dog returned to its tilted position by the action of the spring thereon. On completion of the transport of the filter plate, the drive dog forcibly stops the carrier. The resulting excess load acts to reverse the direction of the travel of the carrier, allowing the carrier to travel forward for the transport of the next filter plate. The stopper for the drive dog is movable or detachable. In the course of the forward travel of the carrier subsequent to the completion of the transport of all the filter plates, the stopper is shifted or removed to release the drive dog and tilt, independently of the stop dog, the drive dog in the same direction as the stop dog already in its tilted position. The drive dog is therefore returnable to its standby position free of interference with the group of transported filter plates and is halted at that position. The drive dog is held in its upright position again by the stopper and thereby made ready for the subsequent transport operation.

The drive dog is releasable and returnable to its held position and the carrier is returnable to its standby position either automatically or manually. For automatic operation, the stopper for the drive dog is pivoted to the carrier so as to be movable between a drive dog engaging position and a releasing position and is usually held in the engaging position. One end of the filter press positioned toward the direction opposite to the transport direction is provided with a shifting member engageable with a driven portion of the stopper to bring the same into the releasing position and a limit switch for reversing the direction of travel of the carrier. The other end of the filter press is provided with another shifting member for returning the stopper to the engaging position and another limit switch for stopping the carrier.

According to this invention, the stopper for retaining the drive dog in its upright position is pivotably supported so as to be shiftable from the engaging position to the releasing position and vice versa, or is made removable. This simple construction enables the carrier to return to its standby position in a simple manner along a straight path after transporting all the filter plates. This can also be effected automatically.

According to another feature of this invention, the two dogs are so biased as to tilt toward each other. The freely movable member is selectively biased toward either one of the dogs by a force greater than the dog biasing force in order to render that dog tiltable toward the same direction as the other dog. Thus the desired dog is elastically retainable in its raised position. This permits the dogs to function in an interchangeable fashion, thereby enabling the carrier to transport the filter plates in the desired direction. The change in the direction of the transport can be effected in any cycle as desired with use of simple members without departing from the basic features of this invention.

According to another feature of this invention, the carrier provided with the drive and stop dogs, stoppers therefor and freely movable member is retained, movably over a predetermined range, on a support mounted on the carrier drive belt, the carrier being spring-biased in the direction opposite to the transport direction, whereby when the stop dog comes into contact with the handle of a filter plate to impede the travel of the carrier, the resulting impact can be reduced. In the case where the carriers on the opposite sides come into contact with the opposite handles on a filter plate with different timings as when the filter plate is positioned obliquely, the action of the preceding carrier can be absorbed by the impact absorbing effect for a delayed operation to thereby correct the oblique position of the filter plate, enabling the carriers to act on the opposite handles with the same timing for the transport of the plate. This eliminates objections such as inclination of the plate at an increased angle or falling of the plate off the side bars which would arise for example from the oblique arrangement of the plate.

The freely movable member may be made removable or replaceable by another like member of different shape or size, whereby the operative relationship between the drive dog and stop dog is variable. As a result, the cooperative operation of the dogs on the filter plate handle can be ensured with easily adjustable timing.

Other features of this invention will become apparent from the following description and drawings.

DESCRIPTION OF THE PREFERRED EMBODIMENTS

Figure 1:
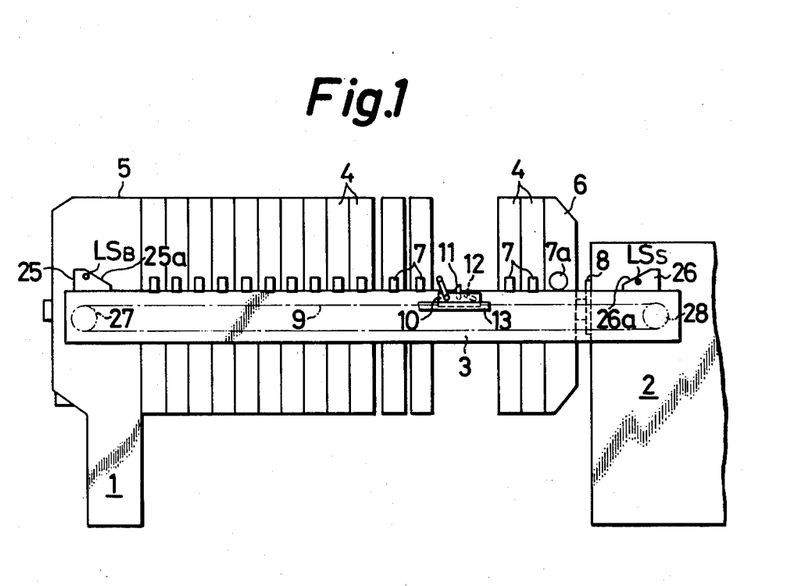
FIG. 1 is a side elevation showing a filter press equipped with a filter plate transporting apparatus as the basic embodiment of the invention.

With reference to FIGS. 1 to 8, the most basic embodiment of this invention will be described. FIG. 1 shows a filter press including a frame 1 provided with a stationary end plate 5, another frame 2 provided with a movable end plate 6, and a pair of side plates 3 extending between, and supported on the opposite sides of, the frames 1 and 2. Each of filter plates 4 arranged between the end plates 5 and 6 has handles 7 projecting from its opposite sides respectively and resting on the side plates 3, whereby the filter plate 4 is movably supported. Similarly the movable end plate 6 is supported by the side plates 3 with handles 7a on its opposite sides resting on the side plates 3. Hydraulic piston-and-cylinder means 8 for advancing and retracting the movable end plate 6 is mounted on the frame 2. The movable end plate 6, when advanced leftward by the extension of the piston-and-cylinder means 8, presses the filter plates 4 against the stationary end plate 6, thereby forming closed chambers for filtration. To remove the cake resulting from filtration and remaining in the filter chambers, the movable plate 6 is first retracted to its original position. A pair of carriers 10 on drive belts 9 disposed on the outer sides of the side plates 3 reciprocally travel, causing a drive dog 11 and a stop dog 12 mounted on each of the carriers 10 to cooperate with the corresponding handle 7 on each filter plate to transport the filter plates 4 one by one toward the movable end plate 6. In this way, the group of filter plates 4 held in pressing contact with one another are separated one after another. The handles 7a on the movable end plate 6 are made shorter than the handles 7 on the filter plates 4 so as not to interfere with the dogs 11 and 12.

Figure 2:
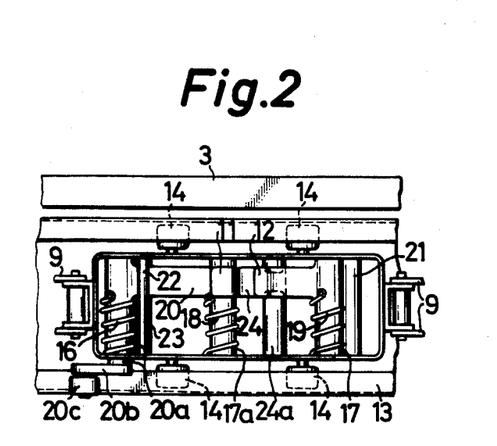
FIG. 2 is a plan view showing the apparatus of FIG. 1.
Figure 3:
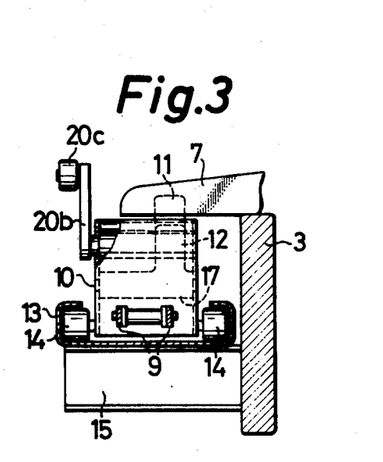
FIG. 3 is a front view of FIG. 2.
Figure 8:
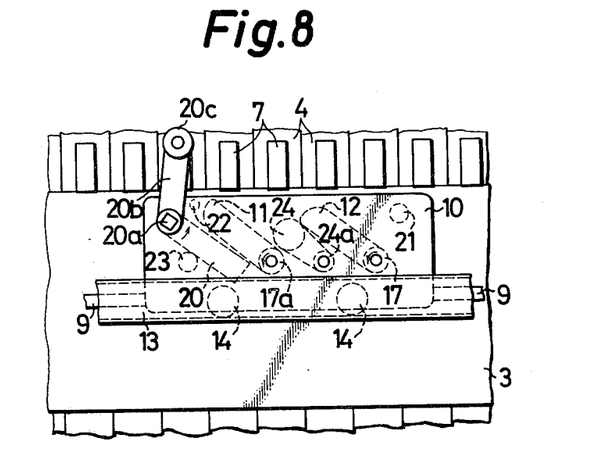

With reference to FIGS. 2 and 8, the carrier 10 is in the form of a frame and is made travellable on a rail 13 secured by a bracket 15 to the outer side of the side plate 3. The carrier 10 is connected to a portion of the endless drive belt 9 which is reciprocally driven by a reversible motor (not shown), whereby the carrier 10 is reciprocally driven along the rail 13. The drive dog 11 and the stop dog 12 are arranged as opposed to each other within the carrier 10 and tiltably supported by pin portions 17 and 17a on the carrier 10. The drive dog 11 is positioned closer to the stationary end plate 5 than the stop dog 12 which is positioned toward the movable end plate 6. The dogs 11 and 12 are always biased by springs 18 and 19 so as to tilt toward the stationary end plate 5. When in upright position, the dogs project above the carrier 10 and come into contact with the handle 7 of the filter plate 4 during the reciprocal travel of the carrier 10. A movable stopper 20 is disposed on one side of the drive dog 11 toward the stationary end plate 5, and a fixed stopper 21 on one side of the stop dog 12 toward the movable end plate 6. The movable stopper 20 is integral with a pin portion 20a which pivotally supports the stopper 20 on the carrier 10. An arm 20b secured to one end of the pin portion 20a projecting outward from the carrier 10 carries at its free end a driven member 20c. When the stopper 20 is in its horizontal position, the gravity acting on the arm 20b produces a counterclockwise moment about the pin portion 20a, holding the stopper 20 in the horizontal portion in contact with a holding pin 22. When the stopper 20 is in its tilted position as shown in FIG. 8, the gravitational clockwise moment about the pin portion 20a holds the stopper 20 in the tilted position in contact with a holding pin 23. While the stopper 20 is in its horizontal position, the free end of the stopper bears against the drive dog 11 and holds the drive dog 11 in its raised position, whereas when the stopper 20 is in its tilted position, the dog 11 is free of the holding engagement with the stopper 20. The stopper 21, which is fixed to the carrier 10, always prevents the stop dog 12 from tilting toward the movable end plate 6 against the spring 19. A freely movable member 24 interposed between the drive dog 11 and the stop dog 12 is pivoted by a pin portion 24a to the carrier 10 and is pushed by the drive dog 11 when the dog 11 is tilted toward the movable end plate 6 against the spring action thereon. The stop dog 12 held in its tilted position by the spring 19 is forced to rise by the movable member 24 thus pushed.

A shifting plate 25 for shifting the movable stopper 20 from horizontal position to tilted position is mounted on a portion of the side plate 3 where the stationary end plate 5 is positioned. Another shifting plate 26 for shifting the stopper 20 from tilted position to horizontal position is mounted on a portion of the side plate 3 on the frame 2 provided with the movable end plate 6. These shifting plates are positioned on the path of travel of the driven member 20c on the stopper 20 when the member travels by virtue of the reciprocal travel of the carrier 10. When coming into contact with the driven member 20c, the shifting plates push the driven member and shift the position of the stopper 20. The shifting plate 25 is provided with a limit switch $LS_B$ which is actuated by contact with the driven member 20c to reverse the rotation of the drive motor for the endless drive belt 9. The shifting plate 26 is provided with a limit switch $LS_S$ which is actuated by contact with the driven member 20c to stop the motor. Wheels 27 and 28 around which the endless drive belt 9 is reeled are mounted on a portion of the side plate 3 on the stationary end plate 5 and a portion of the frame 2 and define the range of the straight path of the reciprocally travellable carrier 10 sufficient to enable the driven member 20c on the movable stopper 20 to contact the shifting plates 25 and 26. One of the wheels is coupled to the motor to serve as a drive wheel.

Figure 4:
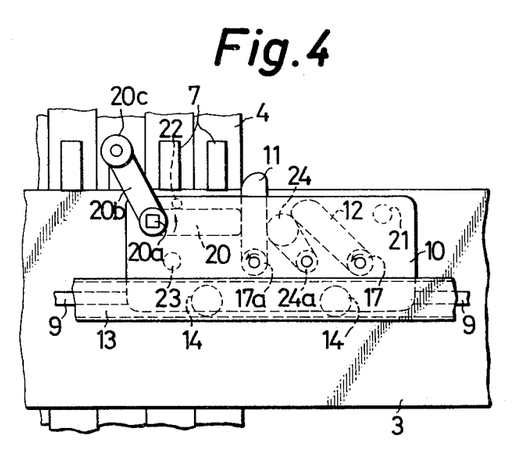
FIGS. 4 to 8 are side elevations showing the operation of the apparatus.
Figure 5:
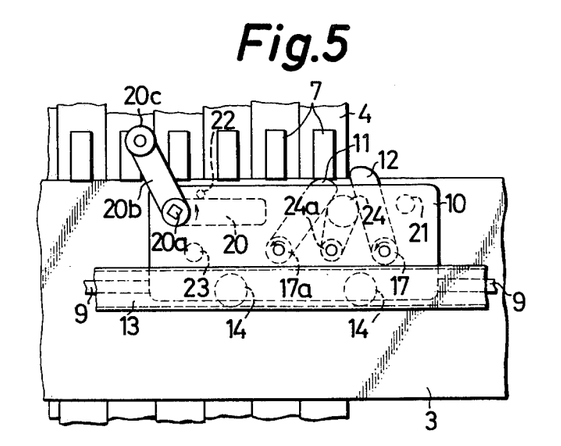

Usually the carrier 10 is positioned at the frame portion 2 close to the movable end plate 6. The movable stopper 20 is held in its horizontal position by the action of the shifting plate 26 to be described later in detail, maintaining the drive dog 11 in its upright position as seen in FIG. 4. The stop dog 12 is held tilted toward the stationary end plate 5 as retracted in the carrier 10 by the action of the spring 19, pressing the freely movable member 24 against the drive dog 11. When the movable end plate 6 has been returned to the position of FIG. 1 on completion of filtration, the drive motor for the endless drive belt 9 is driven in the positive direction and drives the carrier 10 in the above-mentioned position leftward in FIG. 1. The carrier 10 therefore advances toward the group of filter plates 4 which are held pressed against the stationary end plate 5, causing the upright drive dog 11 to approach the group of filter plates 4 as seen in FIG. 4 and thereafter bringing the drive dog 11 into contact with the handle 7 of the foremost filter plate 4. With a further travel of the carrier 10, the drive dog 11 is tilted toward the movable end plate 6 against the spring 18 and finally passes under the handle 7 as seen in FIG. 5. The tilting of the drive dog 11 toward the movable end plate 6 forces the freely movable member 24 toward the movable end plate 6. The movable member 24 in turn raises the stop dog 12 to its upright position against the spring 19. When the drive dog 11 passes under the handle 7, the stop dog 12 has been raised by the advance of the carrier 10 to a level at which the dog 12 contacts the handle 7 (FIG. 5).

As the carrier 10 further advances leftward from the position of FIG. 5, the drive dog 11 comes out of engagement with the handle 7 of the foremost filter plate 4 beneath which the dog 11 has passed and is brought to a raised position between that handle 7 and the handle 7 of the next filter plate 4 by the action of the spring 18. Thus the drive dog 11 is raised smoothly between the handles 7 by the spring 18 until it comes into contact with and is restrained by the handle 7 of the following filter plate 4. If the drive dog 11 were not restrained by the handle 7 depending on the distance between the handles 7 and that between the dogs 11 and 12, the drive dog 11 would be raised to its upright position in which it is engaged by the stopper 20. On the disengagement of the drive dog 11 from the handle 7 on the foremost filter plate 4, the stop dog 12 is released from the holding force of the movable member 24, whereupon the spring 19 tends to tilt the dog 12 toward the stationary end plate 5. However, the stop dog 12 comes into contact with the handle 7 of the foremost filter plate 4 and is thereby prevented from tilting. Although the carrier 10 may further advance, the handle 7 impedes the advance of the stop dog 12 and raises the dog 12 to its upright position against the spring 19. The contact of the dog 12 with the stopper 21 as indicated in the phantom line in FIG. 5 prevents the dog 12 from tilting further toward the movable end plate 6, thus impeding the advance of the carrier 10. This produces excess load on the endless drive belt 9 which drives the carrier 10 as well as on the drive mechanism. In response to the excess load, the reversible motor which has been driven in the positive direction is initiated into reverse rotation by the known means.

Figure 6:
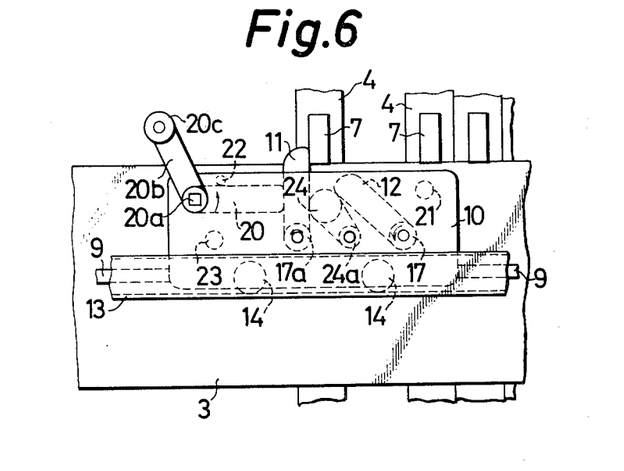

The reverse rotation of the motor retracts the carrier 10 rightward from the phantom-line position in FIG. 5. With the rightward travel of the carrier 10, the drive dog 11 is progressively raised by the spring 18 between the handle 7 of the foremost filter plate 4 and the handle 7 of the following filter plate 4 while approaching the former handle. The stop dog 12 moves away from the handle 7 on the foremost filter plate 4 and is progressively turned toward the stationary end plate 5 by the action of the spring 19. Subsequently, the drive dog 11 is raised by the spring 18 to its upright position into contact with the stopper 20. While being prevented from any further turn toward the stationary end plate 5, the drive dog 11 comes into contact with the handle 7 of the foremost filter plate 4 and delivers the movement of the carrier 10 to the foremost filter plate 4 through the handle 7, thus pushing the filter plate 4 rightward in FIG. 6, namely toward the movable end plate 6. Before the upright drive dog 11 starts to push the filter plate 4 in engagement with the handle 7 thereon, the stop dog 12 disengages from the handle 7 and is held in its tilted position by the spring 19 as shown in FIG. 6.

Figure 7:
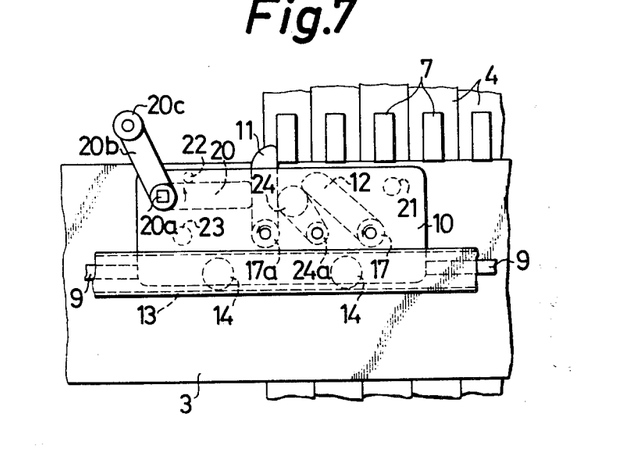

Accordingly when the carrier 10 has completely transported the filter plate 4 toward the movable end plate 6, the stop dog 12, even in the presence of some preceding filter plates 4 as seen in FIG. 7, will not interfere with the handle 7 on the preceding filter plate 4, permitting the drive dog 11 to completely transport the filter plate 4 into pressing contact with the preceding filter plate 4. Upon the transported filter plate 4 coming into pressing contact with the movable end plate 6 or with the preceding filter plate 4, the carrier 10 is prevented from any further retraction, with the result that excess load acts on the drive system for the carrier 10. In response to the excess load, the reversible motor is changed over for positive rotation. The carrier 10 is therefore driven leftward in FIG. 7 again for the transport of the following filter plate 4.

The same operation as above is thereafter repeated. When the last filter plate 4 has been completely transported toward the movable end plate 6, the carrier 10 in the position as shown in FIG. 7 is driven leftward by the positive rotation of the motor. However, since no filter plate 4 remains on the side of the stationary end plate 5, rendering the upright drive dog 11 free of any interference, the carrier 10 reaches the position of the stationary end plate 5, permitting the driven member 20c on the stopper 20 to come into contact with the slope 25a on the shifting plate 25 on the stationary end plate portion. With the further advance of the carrier 10, the driven member 20c is pushed by the slope 25a in sliding contact therewith, causing the arm 20b and the pin portion 20a to turn the stopper 20 clockwise to the position shown in FIG. 8. The stopper 20 thus turned releases the drive dog 11 from its upright position, permitting the spring 18 to tilt the drive dog 11 toward the stationary end plate 5 into contact with the inclined stopper 20. The dogs 11 and 12 are now in retracted position within the carrier 10.

In the final stage of the turn of the stopper 20, the driven member 20c actuates the limit switch $LS_B$ on the shifting plate 25, initiating the reversible motor into reverse rotation. In timed relation to the tilting of the drive dog 11, the carrier 10 is retracted toward the movable end plate 6. Even after the carrier 10 has reached the position of the filter plates 4 on the side of the movable end plate 6, the carrier 10 further retracts under the handles 7 on the filter plates 4 as seen in FIG. 8 since the dogs 11 and 12 on the carrier are held out of contact with the handles 7. On reaching the position of the frame 2, the carrier 10 moves further backward with the driven member 20c on the stopper 20 in contact with the slope 26a of the shifting plate 26. During this backward movement, the driven member 20c is pushed by the slope 26a in sliding contact therewith, causing the arm 20b and pin portion 20a to return the stopper 20 from tilted position to horizontal position. The stopper 20 returns while raising the drive dog 11 against the spring 18 from its tilted position and, on coming to its horizontal position, the stopper 20 retains the drive dog 11 in the upright position in pressing contact therewith. In the final stage of the rise of the drive dog 11, the driven member 20c on the stopper 20 actuates the limit switch $LS_S$ on the shifting plate 26. The limit switch $LS_S$ de-energizes the reversible motor simultaneously with the retention of the drive dog 11 in its upright position, bringing the carrier 10 to a halt. The halted carrier 10 is now in its original state with the drive dog 11 in its upright position and the stop dog 12 in its tilted position. the carrier 10 remains in this position until the motor is driven in the positive direction upon completion of the subsequent filtration.

The transport of the filter plates 4 is completed in the manner described above for one cycle of filtration. When the group of filter plates 4 pressed against the stationary end plate 5 are released from one another one by one for transport, the cake falls from the chamber between the adjacent plates.

To enable the stopper 20 to retain the drive dog 11 in its upright position with improved stability, the stopper 20 is biased in a counterclockwise direction in FIG. 4 by a spring 16 which is weaker than the spring 18 on the drive dog 11 as shown in FIG. 2. The drive dog 11, when inclined toward the stationary end plate 5, will not be raised by the action of the spring 16 on the stopper 20.

Figure 9:
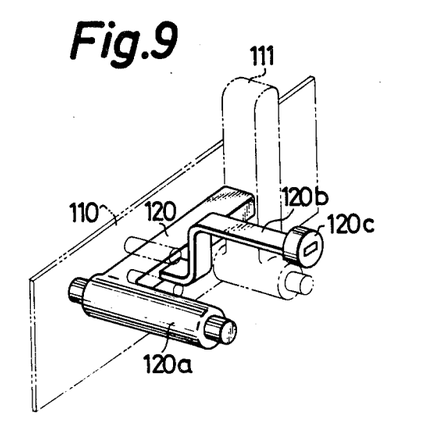
FIG. 9 is a perspective view showing a modification of the stopper for holding the drive dog.

According to the embodiment shown in FIG. 9, a stopper 120 for retaining a drive dog 111 in its upright position is pivoted at its pin portion 120a to a carrier 110 in the same manner as in the foregoing embodiment. The stopper 120 has an arm 120b carrying a driven member 120c and extending approximately from the base portion of the stopper 120.

According to the two embodiments, the stoppers 20, 120 are operable by manually manipulating the arms 20b, 120b to change the driving direction and stop the carrier instead of resorting to the automatic operation with use of the shifting plates and limit switches described. In this case, the driven members 20c, 120c on the arms 20b, 120b may be in the form of a handle convenient for manual operation.

Figure 10:
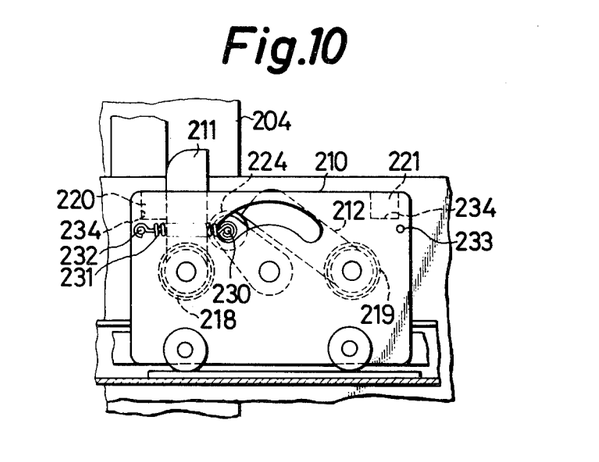
FIG. 10 is a side elevation of another embodiment with which the direction of transport of filter plates is changeable.
Figure 11:
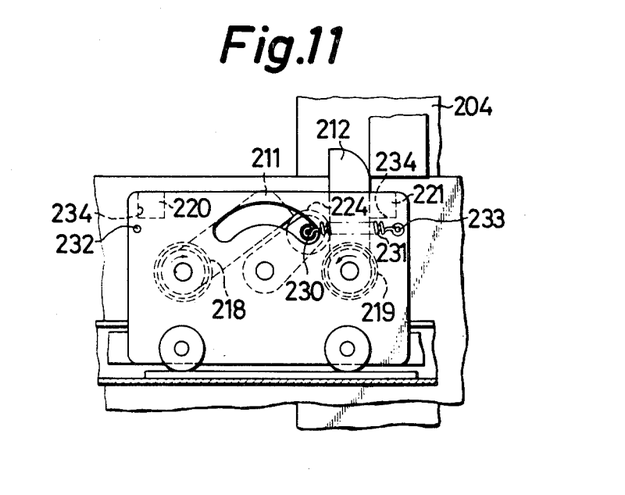
FIG. 11 is a side elevation showing the same in which the transport direction is changed from that in FIG. 10.

FIGS. 10 and 11 show an embodiment in which tiltable drive dog 211 and stop dog 212 on a carrier 210 are biased by springs 218 and 219 respectively toward each other. A freely movable member 224 is provided between the dogs 211 and 212 and pivoted to the carrier 210. A spring 231 has one end attached as at 230 to the movable member 224 and the other end which is selectively engageable by either a pin 232 beside the drive dog 211 or a pin 233 beside the stop dog 212. The spring 231 is stronger than the springs 218 and 219. Depending on whether the other end of the spring 231 is held by the pin 232 or 233, the spring 231 causes the freely movable member 224 to always bias the drive dog 211 toward its upright position against the spring 118 as shown in FIG. 10 or to always bias the stop dog 212 toward its upright position against the spring 219 as shown in FIG. 11.

A stopper 220 for preventing the drive dog 211 from tilting toward the stationary end plate and a stopper 221 for preventing the stop dog 212 from tilting toward the movable end plate are fitted in recesses 234 formed in the inner surface of a side plate of the carrier 210 so as to be removable upward from the carrier 210.

When the drive dog 211 is always biased toward its upright position as shown in FIG. 10, the stop dog 212 is tilted toward the stationary end plate at all times as in the first embodiment, such that filter plates 204 are transported from one side close to the stationary end plate toward the movable end plate by the reciprocal travel of the carrier 210. The carrier 210 is made retractable toward the movable end plate after the completion of the transport of the last filter plate by removing the stopper 220 beside the drive dog 211 from the carrier 210 and causing the spring 231 to incline the drive dog 211 toward the stationary end plate.

When the stop dog 212 is always biased toward its upright position as shown in FIG. 11, the drive dog 211 is inclined toward the movable end plate at all times. The state is exactly reverse to the state of FIG. 10 with respect to a vertical center line, such that the reciprocal travel of the carrier 210 transports the filter plates 204 from the side of the movable end plate toward the stationary end plate. With the stopper 221 removed from the carrier 210, the spring 231 inclines the stop dog 212 toward the movable end plate, permitting the carrier 210 to retract toward the stationary end plate free of interference with the filter plates transported toward the stationary end plate.

In brief, this embodiment makes it possible to transport the filter plates selectively either toward the movable end plate or toward the stationary end plate. In either case, the carrier 210 can be retracted, free of interference with the group of transported plates, to a position at either end of the filter press toward which the filter plates have been transported.

Figure 12:
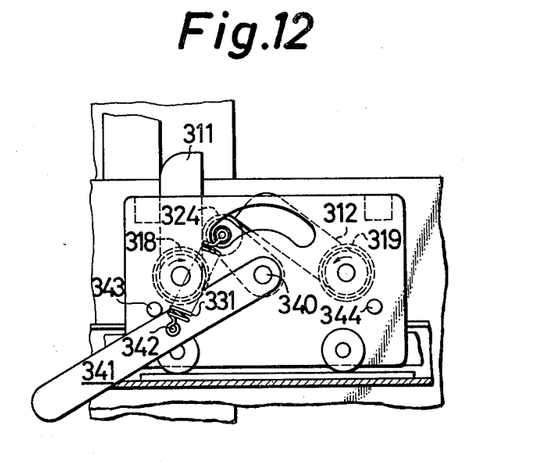
FIG. 12 is a side elevation showing another embodiment with which the transport direction is also changeable.
Figure 13:
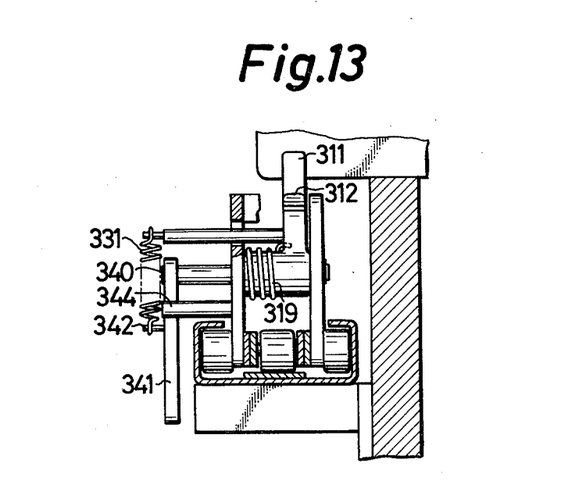
FIG. 13 is a front view of FIG. 12.

FIGS. 12 and 13 show another embodiment including a drive dog 311 and a stop dog 312 biased toward each other by springs 318 and 319 respectively. A spring 331 having one end connected to a freely movable member 324 has the other end connected as at 342 to an intermediate portion of a lever 341 which is pivoted as at 340 coaxially with the freely movable member 324 so as to selectively hold either one of the drive and stop dogs 311 and 312 in an upright position. Depending on whether the lever 341 is inclined toward the drive dog 311 or toward the stop dog 312, one of the dogs 311 and 312 is selectively holdable in the upright position. the operation resulting from which one of the dogs is held in the upright position is similar to that achieved by the embodiment of FIGS. 10 and 11 and will not be described. Indicated at 343 and 344 are pins for defining the leftward position and the rightward position of the lever 341 respectively. The embodiment has the same construction as that of FIGS. 10 and 11 except the features described above.

Figure 14:
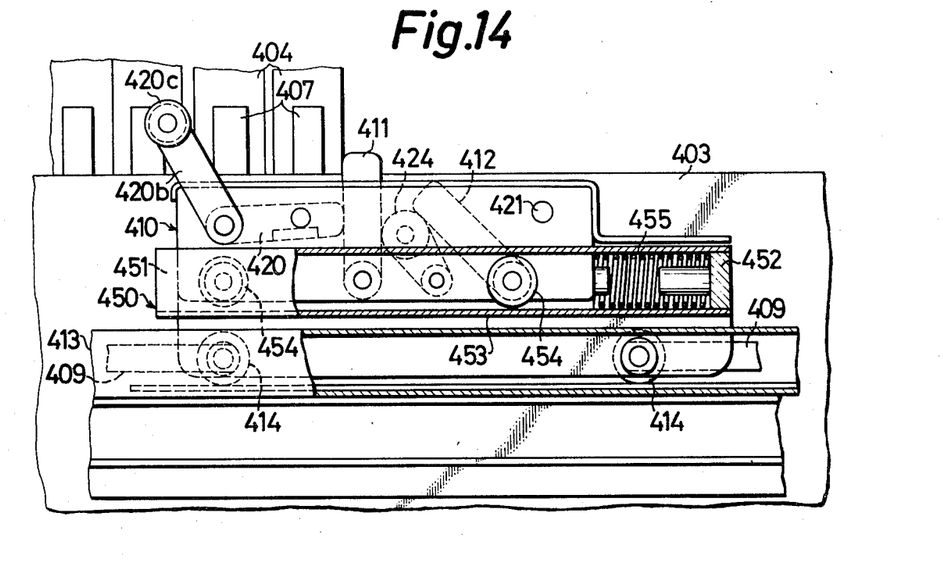
FIG. 14 is a side elevation partly in vertical section showing another embodiment including a carrier having an impact reducing function.
Figure 15:
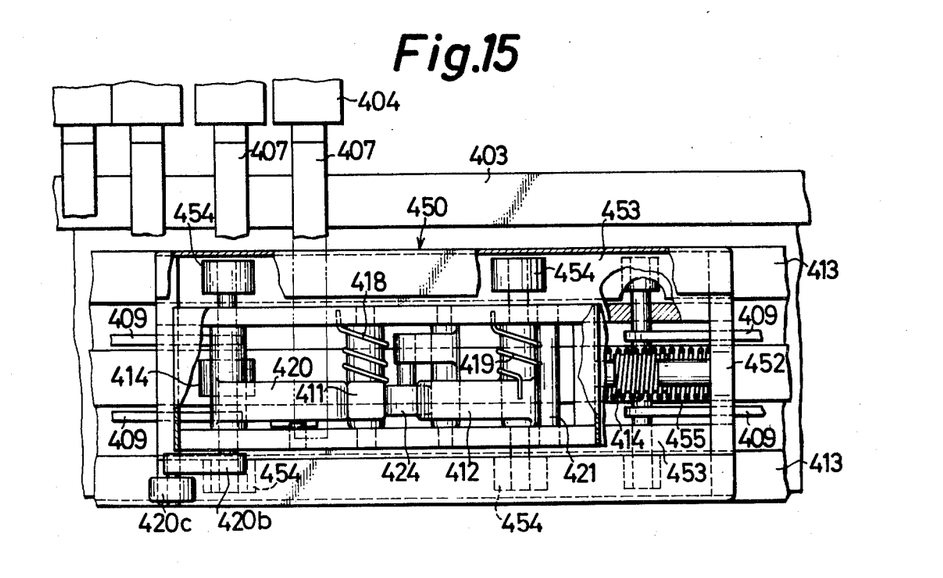
FIG. 15 is a plan view of FIG. 14.
Figure 16:
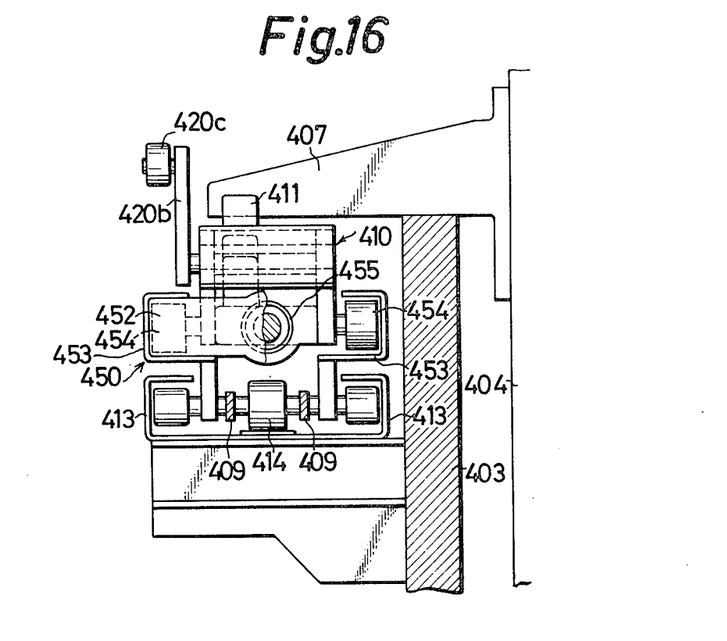
FIG. 16 is a front view of FIG. 14.
Figure 17:
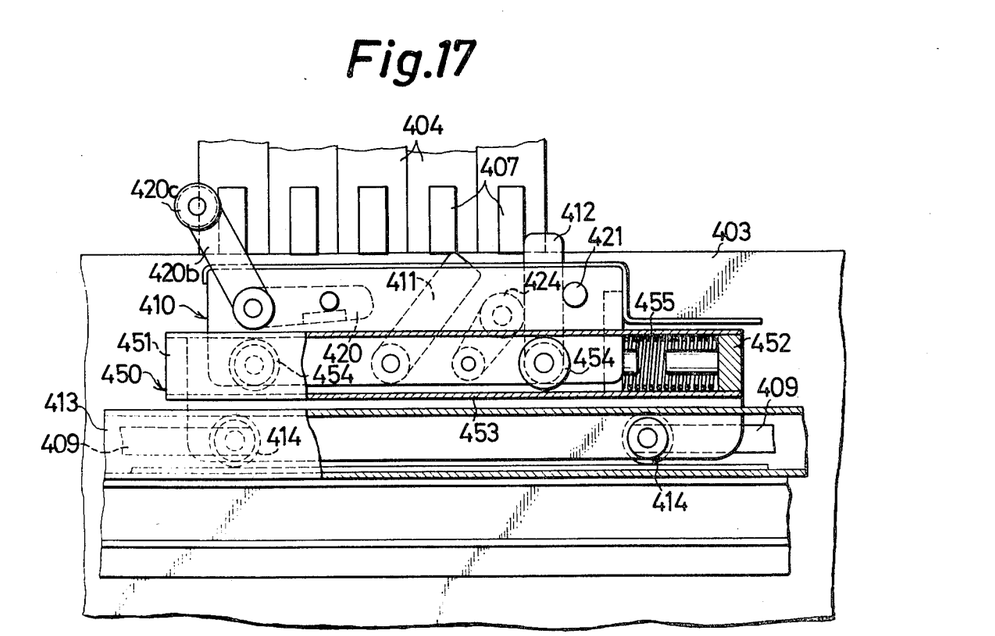
FIG. 17 is a side elevation partly in vertical section showing the same acting for the reduction of impact.

FIGS. 14 and 17 show an embodiment including a carrier 410 provided, as in the first embodiment, with a drive dog 411 and a stop dog 412 pivotably supported and biased toward the stationary end plate by springs 418 and 419, a fixed stopper 421 for preventing the stop dog 412 from tilting toward the movable end plate, a freely movable member 424 interposed between the dogs 411 and 412, and a movable stopper 420 for preventing the drive dog 411 from tilting toward the stationary end plate when in its horizontal position and freeing the drive dog 411 when downwardly inclined. The carrier 410 is supported by a support 450 made travellable by wheels 414 on a rail 413 and connected to an endless drive belt 409 driven by a reversible motor. The carrier 410 is made movable by wheels 454 on rails 453 extending between and on the opposite sides of end walls 451 and 452 of the support 450, the end wall 451 being positioned closer to the stationary end plate and the end wall 452 closer to the movable end plate. The carrier 410 is biased toward the stationary end plate into contact with the end wall 451 by a spring 455 provided between the carrier 410 and the other end wall 452.

Figure 18:
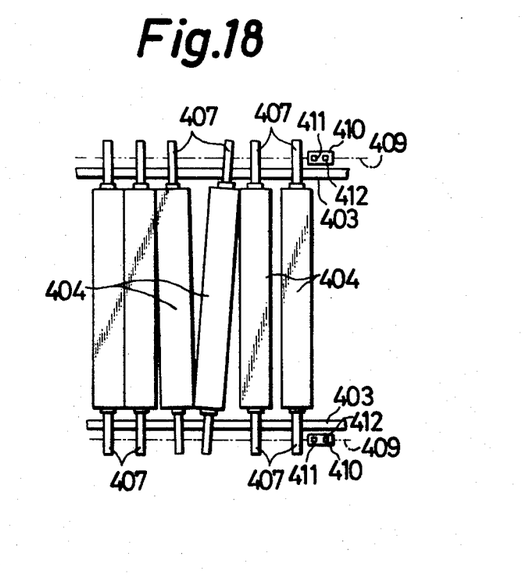
FIG. 18 is a plan view showing part of the filter press to illustrate an arrangement of filter plates.

The filter plates 404 are transported in the same manner as in the first embodiment by the reciprocal travel of the carrier 410. The carrier 410 travels toward the stationary end plate to transport the filter plates 404 as seen in FIG. 14. After the drive dog 411 has passed under the handle 407 of the filter plate 404, the stop dog 412 comes into contact with the handle 407 as shown in FIG. 17, forcibly bringing the drive belt 409 to a halt. The spring 455 serves to reduce the resulting impact at this time. As seen in FIG. 18, the filter plates 404 may not always be regularly arranged; there will be a clearance between the adjacent filter plates or a filter plate may be positioned as inclined. When such a filter plate is to be transported by the carriers 410 on the opposite sides, the filter plate will not be moved at the same time by the opposite carriers 410, with the possible result that the filter plate would be positioned at a greater angle or fall off the side bars 403 or the cake would not be smoothly removable. A similar situation will also result when the opposite carriers 410 do not travel with the same timing. When such an objection occurs with this embodiment, one carrier invariably precedes the other in contacting the handle 407 on one side of the filter plate 404. However, the preceding carrier does not exert a substantial stopping force on the drive belt 409 owing to the shock absorbing action of the spring 455 until the following carrier 410 acts on the other handle 407, giving a certain degree of resistance. For example, when the filter plate 404 to be transported is in an oblique position, the following carrier pushes one side of the filter plate 404 where the plate is away from the following filter plate, such that when the plate to be transported comes into intimate contact at its opposite sides with the following filter plate 404, both the carriers 410 will give the same degree of resistance, consequently forcibly halting the opposite drive belts 409 at the same time, whereupon the motor will be changed over for reverse rotation, thus making it possible to transport the filter plate 404 toward the movable end plate in the proper position with the same timing at both sides. In this way, an improper arrangement of the filter plate or difference in the timing of transport operation can be eliminated. As in the first embodiment, the movable stopper 420 is provided with an arm 420b carrying a driven member 420c.

Figure 19:
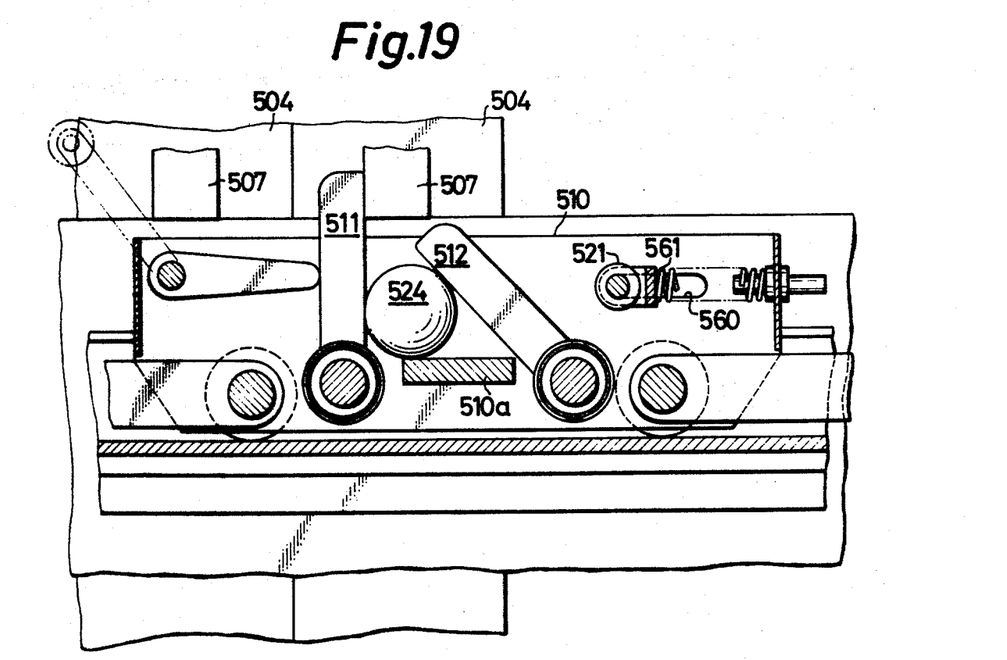
FIG. 19 is a side elevation in vertical section showing another embodiment including a replaceable freely movable member.
Figure 20:
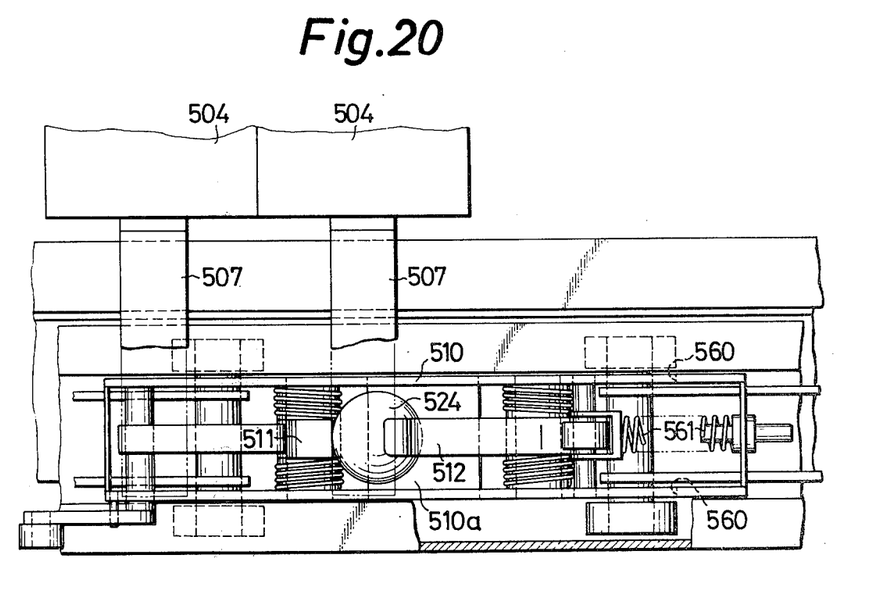
FIG. 20 is a plan view of FIG. 19.
Figure 21:
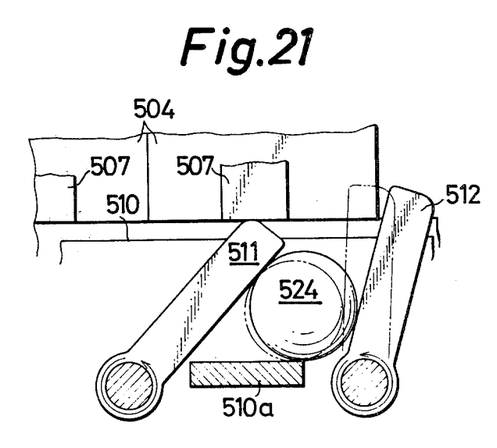
FIG. 21 is a side elevation showing the same during operation.

FIGS. 19 and 20 show another embodiment including a carrier 510 in which a removable a freely movable member 524 is provided between a drive dog 511 and a stop dog 512. The freely movable member 524 in the form of a ball is supported on a bottom plate portion 510a extending between the side plates of the carrier 510 and is freely movable on the bottom plate portion 510a. The member 524 transmits the movement of the drive dog 511 to the stop dog 512. The member 524 is placeable into the carrier 510 and removable therefrom through the top portion of the carrier 510. With the use of freely movable members of varying sizes as shown in the solid and phantom lines in FIG. 21, the drive dog 511, when inclined toward the movable end plate, raises the stop dog 512 to varying degrees so as to adjust the timing for the stop dog 512 to contact the handle 507 of a filter plate 504 after the tilting of the drive dog 512. A stopper 521 for preventing the stop dog 512 from tilting toward the movable end plate is retained in a horizontal slot 560 so as to be movable within a certain range and is biased toward the stop dog 512 by a spring 561. This arrangement serves to accommodate the variations in the raised position of the stop dog 512 and also to mitigate the impact involved and to correct the position of the filter plate 504. With the exception of these features, the embodiment has the same construction as the first embodiment for the same operation.

Figure 22:
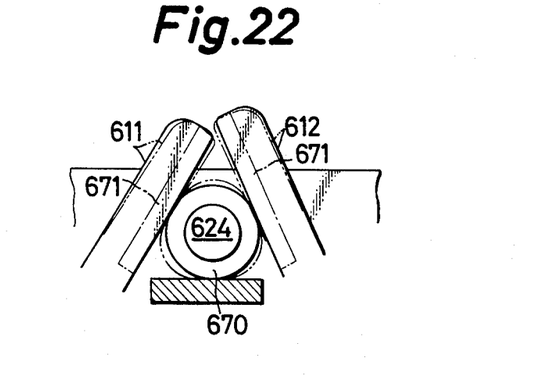
FIG. 22 is a fragmentary side elevation of a modified like member adapted for shock absorption.

FIG. 22 shows another embodiment including a freely movable member 624 provided between the drive dog 611 and the stop dog 612. The freely movable member 624 is surrounded by a layer 670 of rubber or like elastic material for absorbing impact. The same effect is achievable alternatively by attaching an elastic member 671 to part of each of the dogs 611 and 612 where the dog contacts the freely movable member 624 as indicated in the phantom line in FIG. 22.

Figure 23:
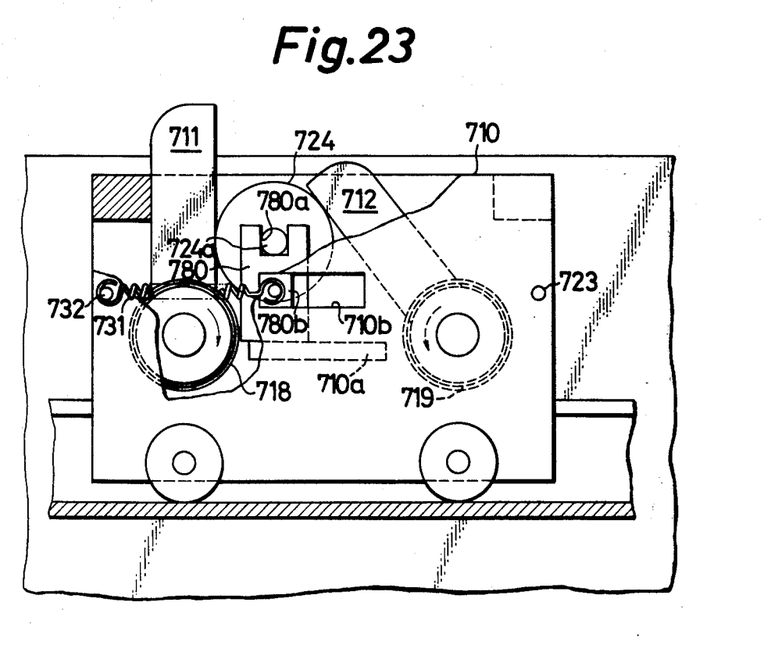
FIG. 23 is a side elevation of another embodiment including a replaceable freely movable member and adapted for the change of transport direction.

FIG. 23 shows another embodiment including a drive dog 711 and a stop dog 712 which are biased toward each other by springs 718 and 719 respectively. A spring 731 has one end acting on a freely movable member 724 provided between the dogs 711 and 712 and the other end which is engageable with a pin 732 beside the drive dog 711 or with a pin 733 beside the stop dog 712. Either one of the dogs 711 and 712 is selectively biased to a raised position at all times depending on which of the pins holds the spring end. The freely movable member 724 has a pin portion 724a removably received in a recessed portion 780a in a slide member 780 provided in the carrier 710. The slide member 780 is movable by being guided by an apertured portion 710b formed in a side wall of the carrier and receiving therein a pin portion 780b of the member 780 and by a bottom plate portion 710a of the carrier 710. the spring 731 acts on the freely movable member 724 through the slide member 780 to which the spring is attached. According to this arrangement, the spring selectively biases the freely movable member 724 toward the drive dog 711 or toward the stop dog 712 for the transport of the filter plates toward the stationary end plate or toward the movable end plate as desired. The freely movable member 724 is replaceable.

Although the present invention has been described above with reference to a filter press of the recessed-plate type in which filter plates alone are used, the invention is similarly applicable to filter presses of the plate-and-frame type in which filter plates and frames are arranged alternately.

What is claimed is:

1. An apparatus to be driven reciprocally for transporting filter plates for use in a filter press including a pair of reciprocally movable carriers each provided with two dogs raisable and tiltable in operative relation to each other by a freely movable member, the dogs being cooperative with a handle on each of the filter plates to transport the filter plates, comprising:
   a. means for biasing the two dogs to tilt the dogs toward the direction opposite to a direction of transport of the filter plates; and
   b. a stopper for preventing one of the dogs positioned toward the opposite direction to the direction of transport of the filter plates from tilting toward the same direction, and a stopper for preventing the other dog positioned toward the transport direction from tilting toward the same transport direction, the first-mentioned stopper being capable of selectively preventing the tilting of said one dog positioned toward the opposite direction or releasing the same dog from its prevented position and the first-mentioned stopper provided for said one dog positioned toward the opposite direction is detachably mounted on the carrier.

2. An apparatus as defined in claim 1 wherein the two dogs are so biased as to tilt toward each other by said means for biasing, and further comprising means for biasing the freely movable member selectively toward either one of the two dogs by a force greater than the dog biasing force, the dogs being holdable by the corresponding stoppers respectively in engagement therewith and releasable from the holding engagement.

3. An apparatus as defined in claim 2 wherein the means for biasing the freely movable member has one end attached to the freely movable member and the other end selectively engageable by a pin on the carrier positioned toward the transport direction or by a pin thereon positioned toward the opposite direction.

4. An apparatus as defined in claim 2 wherein the means for biasing the freely movable member comprises a lever member pivoted to the carrier coaxially with the freely movable member and a tension spring acting between an intermediate portion of the lever member and the free end of the freely movable member.

5. An apparaus as defined in claim 1 wherein the carrier provided with the two dogs, the stoppers for the dogs and the freely movable member positioned between the two dogs is retained on a support mounted on a drive belt for the carrier, the carrier being movable in the transport direction within a specified range relative to the support and being biased toward the opposite direction with respect to the support.

6. An apparatus as defined in claim 1 wherein one of the freely movable member and a portion of each of the two dogs where the movable member contacts the dog is made from an elastic material.

7. An apparatus as defined in claim 1 wherein the freely movable member is detachably mounted on the carrier.

8. An apparatus as defined in claim 7 wherein the freely movable member is fitted in a space between the dogs on the carrier in the form of a frame and supported by a bottom plate portion of the carrier.

9. An apparatus as defined in claim 7 wherein the freely movable member is detachably retained on a slide member mounted on the carrier movably between the two dogs and selectively biased by means toward either one of the dogs by a force greater than the dog biasing force.

10. An apparatus to be driven reciprocally for transporting filter plates for use in a filter press including a pair of reciprocally movable carriers each provided with two dogs raisable and tiltable in operative relation to each other by a freely movable member, the dogs being cooperative with a handle on each of the filter plates to transport the filter plates, comprising:
   a. means for biasing the two dogs to tilt the dogs toward the direction opposite to a direction of transport of the filter plates; and
   b. a stopper for preventing one of the dogs positioned toward the opposite direction to the direction of transport of the filter plates from tilting toward the same opposite direction, and a stopper for preventing the other dog positioned toward the transport direction from tilting toward the same transport direction, the first-mentioned stopper being capable of selectively preventing the tilting of said dog positioned toward the opposite direction or releasing the same dog from its prevented position and the first-mentioned stopper provided for said one dog positioned toward the opposite direction is pivoted to the carrier so as to be movable between a horizontal position for engaging the same dog and a downwardly inclined position for releasing the same dog from the engagement.

11. An apparatus as defined in claim 10, further comprising means for biasing said first-mentioned stopper whereby the first-mentioned stopper is biased by a force smaller than the biasing force on said one dog so as to retain its horizontal position.

12. An apparatus as defined in claim 10 wherein the first-mentioned stopper is provided with an operating arm integral therewith and extending outward from the carrier.

13. An apparatus as defined in claim 12 wherein one end of the filter press positioned toward the opposite direction is provided with a shifting plate engageable with the arm of the stopper to bring the stopper into its inclined position and a limit switch for reversing the direction of the movement of the carrier, and the other end of the filter press positioned toward the transport direction is provided with a shifting plate engageable with the arm of the stopper to bring the stopper into its horizontal position and a limit switch for stopping the movement of the carrier.

* * * * *